United States Patent [19]

Wysocki et al.

[11] Patent Number: 5,111,320

[45] Date of Patent: May 5, 1992

[54] FERROLECTRIC LIQUID CRYSTAL DEVICES HAVING IMPROVED OPERATING PROPERTIES BY USING AN ELECTRONIC MASK

[75] Inventors: Joseph J. Wysocki, Webster, N.Y.; Sui K. Hark, Shatin, Hong Kong; Virgil J. Hull, Perinton, N.Y.; Joseph F. Stephany, Williamson, N.Y.; Andras I. Lakatos, Penfield, N.Y.; Ram S. Narang, Fairport, N.Y.

[73] Assignee: Xerox Corporation, Stamford, Conn.

[21] Appl. No.: 619,411

[22] Filed: Nov. 29, 1990

[51] Int. Cl.$^5$ .............................................. G02F 1/13
[52] U.S. Cl. ......................................... 359/87; 359/67
[58] Field of Search .................... 350/350 S, 333, 334, 350/336; 340/784, 713; 355/40; 359/62, 87, 89, 56

[56] References Cited

U.S. PATENT DOCUMENTS

| | | | |
|---|---|---|---|
| 4,367,924 | 1/1983 | Clark et al. | 350/334 |
| 4,493,531 | 1/1985 | Bohmer et al. | 350/336 |
| 4,595,259 | 6/1986 | Perregaux | 350/331 R |
| 4,602,850 | 7/1986 | DeBenedetti | 350/353 |
| 4,653,859 | 3/1987 | Masaki | 350/333 |
| 4,729,642 | 3/1988 | Kaneko | 350/350 S |
| 4,747,671 | 5/1988 | Takahashi et al. | 350/336 |
| 4,834,506 | 5/1989 | Demke et al. | 350/333 |
| 4,835,657 | 6/1989 | Gunji et al. | 350/350 S |
| 4,846,560 | 7/1989 | Tsuboyama et al. | 350/350 S |
| 4,896,945 | 1/1990 | Ooba et al. | 350/332 |
| 4,902,103 | 2/1990 | Miyake et al. | 350/336 |
| 4,929,057 | 5/1990 | Aoki et al. | 350/333 |

Primary Examiner—Stanley D. Miller
Assistant Examiner—Huy K. Mai
Attorney, Agent, or Firm—Oliff & Berridge

[57] ABSTRACT

A light shutter is provided wherein a first plate which includes a pixel electrode for use in applying a includes a background electrode located adjacent the pixel voltage potential across a ferroelectric material also electrode and substantially surrounding the pixel electrode, whereby an electronic mask can be created adjacent the pixel electrode in the ferroelectric material. A second plate which, along with the first plate sandwiches the ferroelectric material, includes a backplane electrode which is used in conjunction with the pixel and background electrodes on the first plate for applying voltage potentials across the ferroelectric material. By maintaining a minimal amount of spacing between the background electrode and the pixel electrode, a voltage potential can be applied between the background and backplane electrodes so that the ferroelectric material located adjacent the pixel electrode can be maintained in, for example, a non-light transmissive state whereby the contrast between the pixel and inter-pixel regions is greatly improved. Image bars or displays can be formed by arranging a plurality of light shutters (and consequently, pixel electrodes) on the first plate with one or more background electrodes surrounding the plurality of pixel electrodes. Additionally, the background electrode and/or other electrodes can be used for applying electric fields to the ferroelectric material which are non-parallel to the polarization direction of the molecules of the ferroelectic material to reduce the time required to change the ferroelectric material between light transmissive and light blocking states.

42 Claims, 5 Drawing Sheets

FERROLECTRIC LIQUID CRYSTAL DEVICES HAVING IMPROVED OPERATING PROPERTIES BY USING AN ELECTRONIC MASK

BACKGROUND OF THE INVENTION

1. Field of the Invention

The present invention relates to devices which selectively permit or block the passage of light therethrough by reversing the polarity of a voltage which is applied across a bistable ferroelectric material, and in particular, to ferroelectric liquid crystal devices capable of producing images having superior contrast and which can be changed quickly between light transmissive and light blocking states.

2. Description of Related Art

Light shutters are devices which can be controlled to selectively block or permit the transmission of light therethrough. Light shutters have numerous applications. For example, a single light shutter can be used in systems which transmit data optically to permit or prevent the transmission of optical signals therethrough much like an electrical switching device is used in systems which transmit data electrically. A linear array, or a matrix of light shutters can be arranged between a light source and a photosensitive material such as, for example, a photoconductive drum or belt, in an image producing machine such as a copier, printer, or facsimile machine. As the photosensitive material moves past the array or matrix of light shutters, the light shutters are selectively actuated to block or permit the transmission of light from the light source to the photosensitive material to form a latent image on the photosensitive material. This latent image is, for example, toner developed and then transferred to a sheet of paper to form a permanent image on the sheet. A matrix of light shutters is also typically used to form a display or display screen wherein the light shutters are selectively actuated to form images on the display screen by controlling the transmission of light through portions of the display screen or by controlling the reflection of light by a surface located behind the display screen. Other uses of light shutters are known and possible and are intended to be covered by the present invention. For example, it is known to use liquid crystal display devices for copiers, printers, or the like. See, for example, Xerox Corp. U.S. Pat. Nos. 4,506,956, 4,527,864, and 4,475,806.

Liquid crystals are commonly used to form light shutters. Liquid crystals are well known and, generally, are made from materials which exhibit more than one refractive index depending upon their orientation, and whose orientation can be changed by the application of an electrical potential. It is also known to use ferroelectric materials to form liquid crystals. See U.S. Pat. No. 4,367,924 to Clark and Lagerwall, the disclosure of which is herein incorporated by reference. The ferroelectric liquid crystal in a suitably prepared device has bistability, i.e., has two stable states comprising a first optically stable state (first orientation state) and a second optically stable state (second orientation state), with respect to an electric field applied thereto. Accordingly, the liquid crystal is oriented to the first optically stable state in response to one electric field vector and to the second optically stable state in response to a reversed electric field vector. Further, this type of liquid crystal very quickly assumes either one of the above-mentioned two stable states in response to the direction of an electric field applied thereto and retains such state in the absence of an electric field.

Thus, ferroelectric liquid crystals are polarity sensitive. In any device in which they are used, their response depends upon the sign of the applied voltage as well as upon its magnitude. This unique feature lends itself to the construction of a class of devices in which the optical properties of the device and its speed of response can be controlled in a new and beneficial way. This new way of constructing and operating these devices imposes little added complexity to the liquid crystal technology as currently practiced.

Consider the following conditions. Liquid crystal devices (or light shutters) include a liquid crystal material (e.g., a ferroelectric material) sandwiched and sealed between first and second substrates (e.g., glass plates). In order to control the orientation of the liquid crystal material sandwiched between these two substrates (and thus the light transmission through the liquid crystal material), one or more electrodes (hereafter referred to as pixel electrodes) are formed on, for example, the first substrate. These pixel electrodes can be made, for example, from an electrically conducting, transparent material such as, for example, indium-tin-oxide (ITO). At least one counterelectrode (also referred to as a backplane electrode) is located on the second substrate and is attached to, for example, ground potential. When an appropriate voltage is applied to a pixel electrode, the liquid crystal material located between that pixel electrode and the backplane electrode is oriented to one of the light blocking or light transmitting states. Thus, in constructing these devices (and in particular, devices such as image bars or displays having a plurality of light shutters and thus a plurality of pixel electrodes), one must delineate electrode areas (which function as pixel electrodes) by physically removing conducting material from a substrate, otherwise all image defining areas (pixel electrodes) would be shorted together. This removal leaves regions between the pixel electrodes where the state of the liquid crystal is undefined. These inter-pixel regions are typically obscured with light shields otherwise the contrast of the device will suffer from uncontrolled transmission of light through the inter-pixel regions. The process of providing light shields is not a trivial one since the amount of material that can be deposited to reduce uncontrolled light transmission is constrained in these devices. Thus, it would be beneficial if the light transmission in these inter-pixel regions was actively controlled, thereby reducing the amount of light transmission substantially below that which would normally occur if the inter-pixel regions were not shielded.

Secondly, the response of a ferroelectric liquid crystal to application of an electric field consists of several stages. There is a delay period after onset of the field during which the material starts to react to the field; this delay is typically characterized as the 0/10% time. This delay period is followed by a rapid transition to the other optically stable state. By convention, the rise time of the device is defined by the time required to switch between 10% and 90% of the full transmittance between the optically stable states. A similar action occurs when the liquid crystal is energized by the opposite polarity to reverse the condition of the system. That is, there is a 100/90% delay time followed by the 90/10% fall time. The various response times are not necessarily symmetric. After application of a field, the system in time will reach an equilibrium at which the light transmission therethrough reaches a maximum of 100%, or conversely, a minimum of 0%.

In a device such as an image bar, for example, it is preferred that the material reach equilibrium for optimum contrast. Otherwise, neither the brightest "on" nor the darkest "off" state is reached. As the speed of operation is increased at constant operating voltage, the contrast will fall because the delay time becomes a significant part of the total response time. Ordinarily, the operating voltage must be increased to overcome these delays. A way of reducing delay times without increasing operating voltage would be beneficial in decreasing the overall delay time of these devices.

U.S. Pat. No. 4,846,560 to Tsuboyama et al discloses a ferroelectric liquid crystal device which controls the liquid crystal orientation between pixel electrodes. A matrix pixel structure is provided and includes a pair of substrates respectively provided with scanning electrodes and signal electrodes intersecting with each other, with a ferroelectric liquid disposed between the scanning and signal electrodes. Each intersection between a scanning and signal electrode forms a pixel. The orientation of the liquid crystal at portions other than the intersections of the signal and scanning electrodes is controlled by providing a base plate with electric charges which provide a voltage exceeding the threshold voltage across the entire ferroelectric liquid crystal so that non-pixel portions of the ferroelectric liquid crystal are maintained in a non-light transmissive state. If the base plate is external to the device, the alignment field is low unless a large charge is deposited onto it. Furthermore, if the base plate is non-conducting, the charge must be applied by a corona, or any other ion-deposition means, a cumbersome process not susceptible to an easy change in field. Still further, since the orienting field is applied everywhere, a higher field is required internally to switch the pixel to a transmitting state because of its opposite polarity. If the base plate is internal to the device, then multiple layers of electrodes are required and must be deposited onto at least one of the substrates. This greatly increases the complexity and cost of the device because of the potential for shorts. The increased switching field would still be required as in the case of an external base plate.

U.S. Pat. No. 4,834,506 to Demke et al discloses placing a mechanical mask between pixel electrodes by printing a matrix of black lines wherever electrode material is removed. See column 2, lines 4–7.

U.S. Pat. No. 4,602,850 to DeBenedetti discloses placement of a light shield behind pixel electrodes to form a barrier which blocks electrostatic coupling between the circuitry which addresses each pixel electrode and the liquid crystal material. DeBenedetti also discloses providing a biasing electrostatic field to the liquid crystal layer by using the shield as an electrode. The potential applied across the liquid crystal by the shield electrode is less than the threshold voltage of the liquid crystal material. This enables smaller incremental voltages to be applied to the individual pixel electrodes to improve the response time of the liquid crystal material.

U.S. Pat. No. 4,493,531 to Bohmer et al discloses methods and arrangements for improving the response time of twisted nematic liquid crystal material by superimposing varying and DC fields in the liquid crystal material. A twisted nematic device has a much different response characteristic than a ferroelectric liquid crystal. Consequently, a field applied to a twisted nematic device would have a different purpose and effect than one applied to a ferroelectric device. In Bohmer, a high frequency field, to which the liquid crystal does not respond, is applied to assist in the relaxation of the liquid crystal when a D-C aligning field is removed. This high frequency field interacts with surface molecules which then influence the relaxation of interior molecules. In the present invention, a transverse field is applied to a ferroelectric liquid crystal to decrease the response time. This transverse field must be in the frequency range in which the molecules everywhere react to the field, otherwise the response time is not modified.

U.S. Pat. No. 4,896,945 to Ooba et al discloses the use of mechanical masks or light shielding layers between pixels in a liquid crystal device. See column 5, lines 58–61.

U.S. Pat. No. 4,747,671 to Takahashi et al discloses a liquid crystal using a ferroelectric material wherein an electrode having a delay function is connected between a signal source and a transmission electrode on a substrate which contacts the ferroelectric material.

As further background regarding methods of driving liquid crystals and ferroelectric liquid crystals, see U.S. Re. Pat. No. 33,120 and U.S. Pat. No. 4,769,659.

OBJECTS AND SUMMARY OF THE INVENTION

It is an object of the present invention to provide light shutters having precisely defined areas for controlling the transmission of light therethrough.

It is another object of the present invention to provide light shutters which use a ferroelectric material whereby the time required to change the ferroelectric material between light transmissive and light blocking states is reduced.

It is a further object of the present invention to provide liquid crystal displays and/or liquid crystal image bars which are capable of achieving high contrast without the use of mechanical masks between pixel electrodes.

To achieve the foregoing and other objects, and to overcome the shortcomings discussed above, a light shutter is provided wherein a first plate which includes a pixel electrode for use in applying a voltage potential across a ferroelectric material also includes a background electrode located adjacent the pixel electrode and substantially surrounding the pixel electrode, whereby an electronic mask can be created adjacent the pixel electrode in the ferroelectric material which makes up the liquid crystal. A second plate which, along with the first plate sandwiches the ferroelectric material, includes a backplane electrode which is used in conjunction with the pixel and background electrodes on the first plate for applying voltage potentials across the ferroelectric material. By maintaining a minimal amount of spacing between the background electrode and the pixel electrode, a voltage potential can be applied between the background and backplane electrodes so that the ferroelectric material located adjacent the pixel electrode can be maintained in, for example, a non-light transmissive state whereby the contrast between the pixel and non-pixel regions is greatly improved. Image bars or displays can be formed by arranging a plurality of light shutters (and consequently pixel electrodes) on the first plate with one or more background electrodes surrounding the plurality of pixel electrodes. Additionally, the background electrode and/or other electrodes can be used for applying electric fields to the ferroelectric material which are non-parallel to the direction of polarization of the molecules of the ferroelectric material to reduce the time required to change the ferroelectric material between light transmissive and light blocking states.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
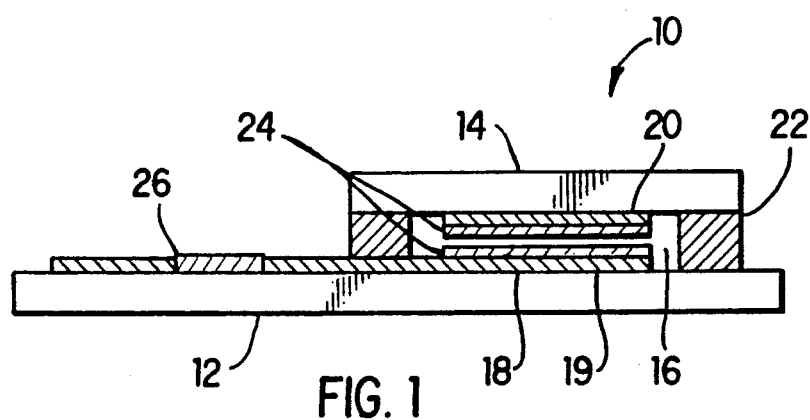
FIG. 1 is a cross-sectional view of a liquid crystal device.

FIGS. 1–6 illustrate an image bar which can be used, for example, in an electrophotographic printer to form light images on a photoconductive belt. The use of such image bars in electrophotographic printers is well known as illustrated in U.S. Pat. No. 4,595,259 to Perregaux, the disclosure of which is herein incorporated by reference. The image bar disclosed in the present invention differs from the image bar used in the above U.S. Pat. No. 4,595,259 in that a ferroelectric liquid crystal material is used instead of the nematic liquid crystal material, and the pixel electrodes are formed so as to have one or more background electrodes surrounding the pixel electrodes as described below. The present invention is applicable to any type of liquid crystal which uses a ferroelectric liquid such as, for example, liquid crystal displays which usually include a plurality of pixel electrodes arranged in a matrix as shown in U.S. Pat. No. 4,846,560 to Tsuboyama et al, the disclosure of which is herein incorporated by reference. Additionally, the present invention is applicable to devices which include a single pixel which functions as a light shutter to selectively permit or block the passage of light therethrough. Such single pixel light shutters are useful in, for example, systems which transmit data optically.

The present invention involves a construction which achieves the beneficial results of improving the contrast between pixel and non-pixel regions of a liquid crystal device containing one or more pixel electrodes as well as decreasing the delay times between the transition of a ferroelectric material between its light blocking and light transmitting orientations without increasing the operating voltage (i.e., the bias voltage or voltage potential applied across the ferroelectric material). The present improvement in constructing liquid crystal devices results in a system for electronically masking regions of the liquid crystal device between the usual electrode patterns (pixel electrodes) and/or for applying transverse fields to the ferroelectric material which will reduce the delay time in cases where improved speed is desired.

Typically, a substrate, or plate, is provided with a coating of an electrode material on one surface thereof. This electrode material is selectively removed to delineate one or more pixel electrodes. Instead of removing all of the electrode material (such as indium-tin-oxide) from a substrate between the desired pixel electrode locations, the present invention substantially retains all of the electrode material on this substrate, separating the active pixel electrodes from the remaining electrode material by a small gap having a width of approximately 1 to 10 times the pixel to back plane spacing, for example, in the range of 1 to 50 micrometers, preferably 2 to 10 micrometers. An alignment layer which is an insulating material is then applied over the plate to cover the pixel electrodes, the remaining electrode material, and the gap between each pixel electrode and the remaining electrode material. This alignment layer, or insulating substrate is provided with a plurality of grooves by, for example, rubbing so as to assist in aligning the ferroelectric material molecules. The use of an alignment layer is well known. In the present invention, by filling the gaps between the pixel electrodes and the remaining electrode material, the alignment layer also functions to act as an insulating substrate so that the pixel electrodes are not shorted to the remaining electrode material. The narrow gaps which are filled with the insulating substrate can be produced using standard processing, or even by laser etching since only a small area of ITO is removed from the plate containing the electrode material. The remaining electrode material located adjacent the active pixel electrode(s) is used in conjunction with a backplane electrode located on a second plate (which is located on an opposite side of the ferroelectric material from the first plate) to form an electronic mask adjacent the pixel electrode(s).

Additionally, the electrode material remaining adjacent the active pixel electrodes (this remaining material is hereinafter referred to as a background electrode) can be used in conjunction with the active pixel electrodes and/or with the backplane electrode to create electric fields through the ferroelectric material which are non-parallel to the ferroelectric polarization so that the molecules are "jolted" from their polarized equilibrium state, thus reducing the delay time between opposite orientations of the molecules. Such a device constructed according to the present invention needs no other mask (i.e., a mechanical mask), although it may be advantageous to combine the electronic mask with other more standard mechanical masks in devices which require an extremely high contrast. The backplane electrode can be a single electrode which opposes all of the pixel electrodes and the background electrode, or can be divided into a plurality of backplane electrodes to be described below. Similarly, the background electrode can be a single electrode which surrounds all of the pixel electrodes, or can be a plurality of background electrodes which cumulatively surround all of the pixel electrodes.

FIG. 1 is a side cross-sectional view of an image bar 10 constructed from a ferroelectric liquid crystal material according to the present invention. Image bar 10 includes a first transparent substrate or plate 12 having at least one pixel electrode 18 formed on a surface thereof. A background electrode 19 is located closely adjacent to the pixel electrode 18. Circuitry 26 for applying a voltage to the pixel electrode 18 is typically provided on the same surface of first substrate 12 as pixel electrode 18. Circuitry 26 is typically a thin film transistor (TFT), as is well known in the art. A second substrate or plate 14 is provided and arranged substantially parallel to first substrate or plate 12. Second plate 14 includes a backplane electrode 20 thereon which opposes the one or more pixel electrodes 18 located on first plate 12. Second plate 14 can also be transparent. A ferroelectric material 16 is located between first and second plates 12, 14, and in particular between the pixel and background electrodes 18, 19 and backplane electrode 20. Ferroelectric material 16 is sealed between first and second plates 12, 14 by spacer 22 and an alignment layer 24 is provided over each electrode 18, 19, 20 and the adjacent ferroelectric material 16 for purposes discussed above and which are well known in the art as disclosed in the above incorporated U.S. Pat. No. 4,595,259. FIG. 1 also shows how the alignment layer 24 on first plate 12 enters the gap between each pixel electrode 18 and the background electrode 19 to prevent short-circuiting therebetween. Crossed polarizers (to be discussed below), which are used with the image bar 10 are not shown in FIG. 1, but are normally placed on surfaces of plates 12, 14 opposite from the surfaces thereof which contact ferroelectric material 16.

Figure 2A:
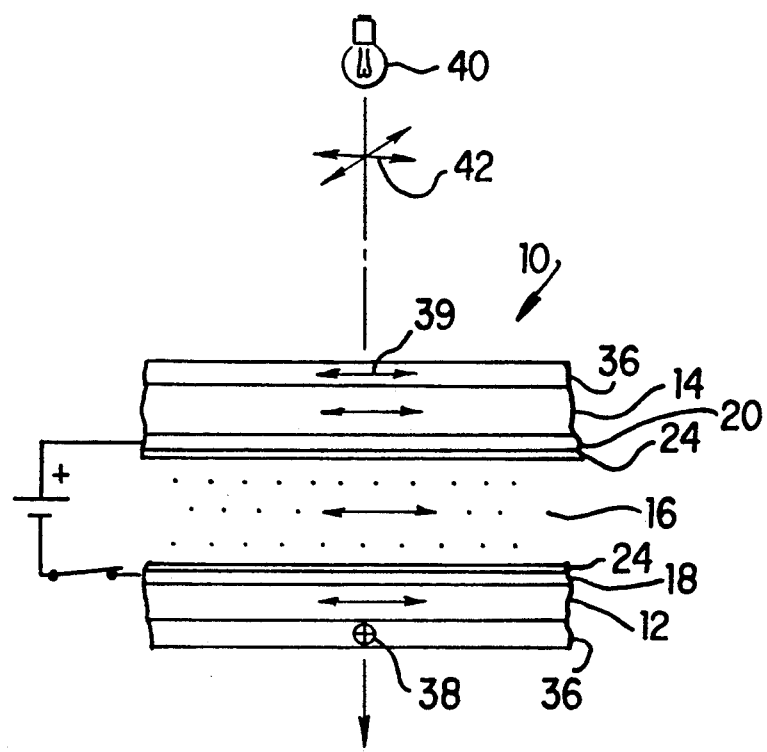
FIG. 2a is a cross-sectional view of a schematic diagram of the ferroelectric molecules and the liquid crystal image bar of FIG. 1, showing the orientation of the ferroelectric liquid crystal molecules in the state where light is being blocked by the ferroelectric molecules and the crossed polarizers.
Figure 2B:
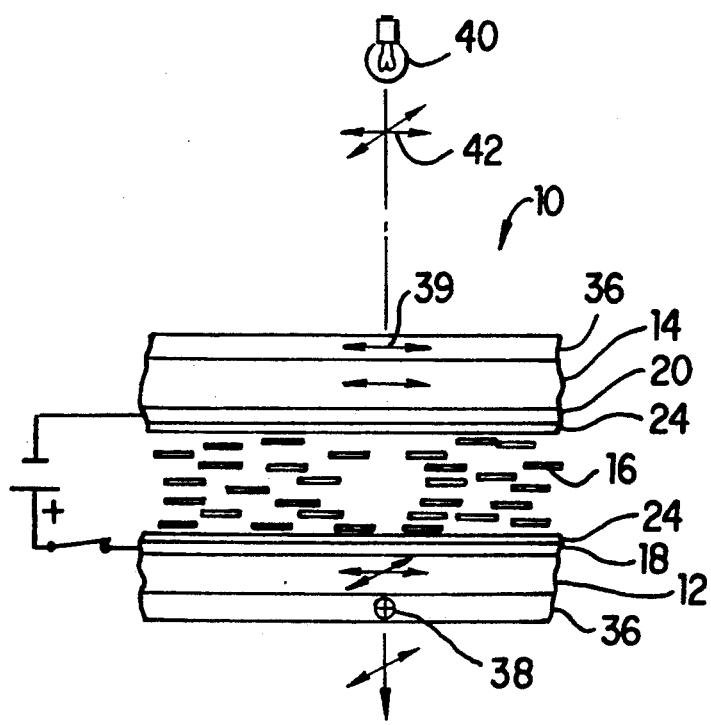
FIG. 2b is the same as FIG. 2a except the ferroelectric material is biased in the opposite direction so that the molecules of the ferroelectric material are biased so as to permit the passage of light therethrough when combined with the polarizers.

FIGS. 2a and 2b diagrammatically illustrate the functioning of a light valve which uses a ferroelectric material. Crossed polarizers 36 are attached to each of the outside surfaces of the two parallel plates 12, 14. Electrodes 18 and 20, which are preferably transparent, are placed on the inner confronting surfaces of substrates 12, 14. A transparent alignment layer 24 covers the electrodes 18, 20. A thin layer of ferroelectric crystal material 16, such as a 1:1 mixture of W7/W82 from Displaytech, Inc. 2200 Central Avenue, Suite C, Bolder, Colo. 80301 is inserted between plates 12 and 14. Other useful ferroelectric liquid crystal mixtures are W7/W8, W37, and W7/W37/W82 from Displaytech, Inc.; CS-1011, CS-1014, CS-1015, CS-1016, and CS-1017 from Chisso Corporation, 2 Kamariyacho, Kanazawa-ku, Yokohama, Japan 236; ZLI3041, ZLI3232, ZLI3233, ZLI3654, ZLI3774, and ZLI3775 from E. Merck, Postfarb 4119, 6100 Darmstadt 1, Germany (U.S. Representative: EM Chemicals, 5 Skyline Drive, Hawthorne, N.Y. 10532); TKF-8617 from Teikoku Chemical Industry Co., Ltd., 10, 1-chome, Kitahorie Kamidori, Nishiku, Osaka, Japan; DOF-0003 from Dainippon Ink & Chemical, Japan; and SCE5 and SCE6 from BDH, a subsidiary of E. Merck, Poole, England.

The polarizing axes of the two polarizers 36 are positioned on substrates 12, 14 so that are mutually perpendicular to each other and so that they are at 45° angle with respect to the main axes of the liquid crystal molecules 16 when the molecules are in the light transmitting state as shown in FIG. 2b. Light depicted as vectors 42 from source 40 enters the liquid crystal material through polarizer 36 located on plate 14. However, only the light vector parallel to the transmission axis 39 of the polarizer on plate 14 enters the liquid crystal material and, because of the orientation of the polarizer with respect to the main axis of the liquid crystal molecules in the state shown in FIG. 2b, the amount of light that is transmitted by the polarizer located on plate 12 is strongly wavelength dependent. In other words, due to birefringence of liquid crystal molecules 16, the light transmitted by the system in the state illustrated in FIG. 2b is made of a complex color mixture. In the state shown in FIG. 2a, the polarized light is blocked by the polarizer on plate 12, because the transmission axis 38 of this polarizer is perpendicular to that of the polarizer on plate 14 and because the state of polarization of the light after it passes through the polarizer on plate 14 is essentially left unmodified by the liquid crystal molecules 16 regardless of wavelength when the liquid crystal molecules are oriented as shown in FIG. 2a. A more detailed description is provided in the above-incorporated U.S. Pat. No. 4,367,924 to Clark and Lagerwall.

Figure 3:
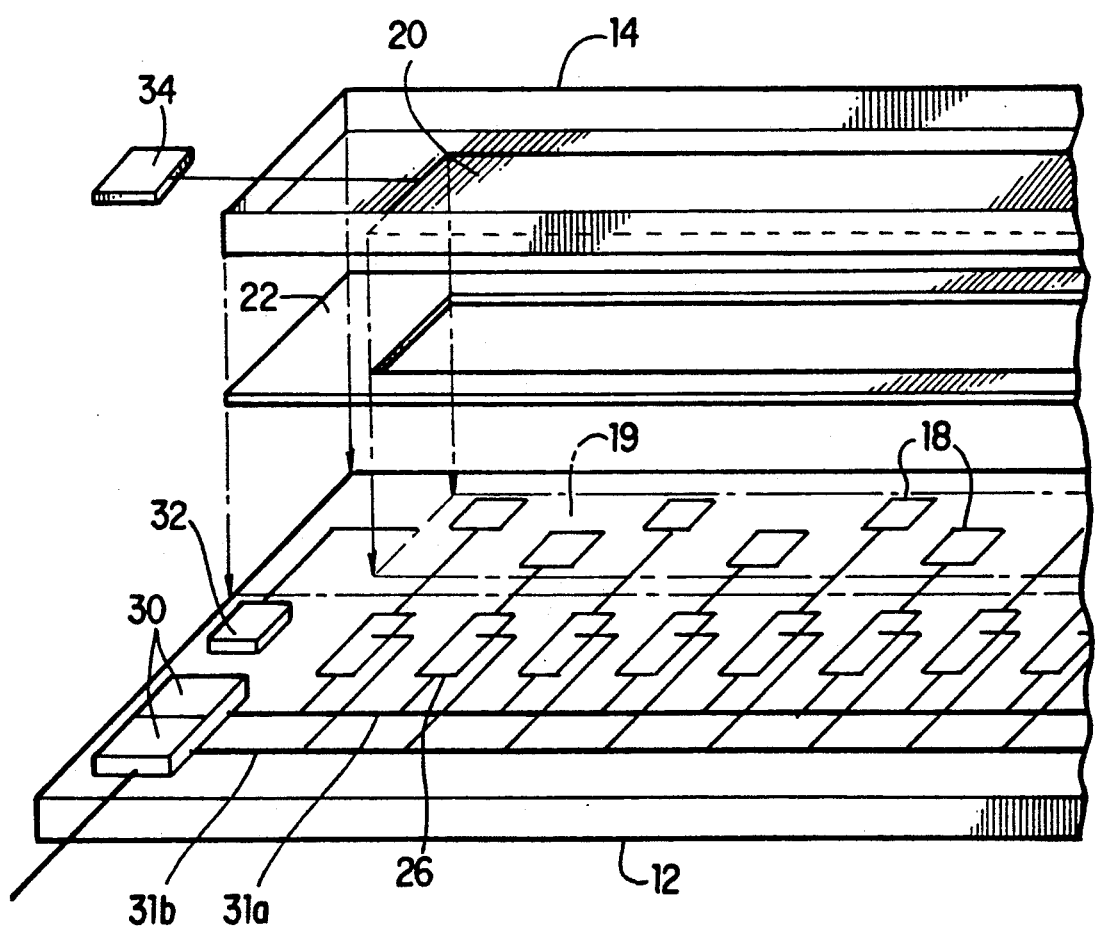
FIG. 3 is an exploded isometric view of an image bar constructed according to the present invention.

In previous devices, the orientation of ferroelectric material molecules 16 between pixels 18 on plate 12 was not precisely controlled and, therefore, mechanical masks were required to be placed over these inter-pixel regions of plate 12 so that no light would be transmitted therethrough. With the present invention as illustrated in FIG. 3, a background electrode 19 is located closely adjacent each pixel electrode 18 on first plate 12. This background electrode 19 can be used to bias the ferroelectric material located between background electrode 19 and backplane electrode 20 (and also located between each pixel electrode 18) so that the ferroelectric material located between each pixel electrode 18 can be uniformly oriented to an optimal state (e.g., a light blocking state).

The voltage which is applied to each of the types of electrodes 18, 19 and 20 can be controlled by a variety of types of control circuitry such as, for example, an electronic controller or microcomputer. See, for example, U.S. Pat. No. 4,783,146 to Stephany et al, the disclosure of which is herein incorporated by reference. Means 34 for applying a voltage to backplane electrode 20 can, for example, merely attach the backplane electrode 20 to ground potential. Since the orientation of the ferroelectric material is polarity sensitive, the polarity of the voltage applied to the respective pixel electrodes 18 and the background electrode 19 will control whether the ferroelectric material located between that electrode and the backplane electrode 20 will be oriented to block or permit the transmission of light therethrough. Means 32 for applying a voltage to the background electrode 19 is used so that the level of light transmission in the regions between each pixel electrode 18 can be uniformly controlled. In its simplest form, a single background electrode 19 can substantially surround all of the pixel electrodes 18 in an image bar or display. When using a single background electrode 19, an appropriate voltage polarity can be substantially continuously applied to the background electrode 19 to orient the ferroelectric material 16 located between background electrode 19 and backplane electrode 20 to its light blocking state, whereby an electronic mask is formed between and surrounding each pixel electrode 18. However, the polarity and strength of the voltage applied to background electrode 19 can be controlled so as to permit a uniform predetermined amount of light to pass in the regions between each pixel electrode for purposes of highlighting. Additionally, the full intensity of light can be permitted to pass in the regions between each pixel electrode in situations where inverse printing is desired. Further, the background electrode 19 can be divided into a plurality of background electrodes so that light transmission through different portions of the inter-pixel regions can be selectively controlled. For example, each pixel electrode 18 can be provided with its own corresponding background electrode. Such an arrangement would permit the intensity of the background surrounding each pixel electrode 18 to be controlled.

Figure 4:
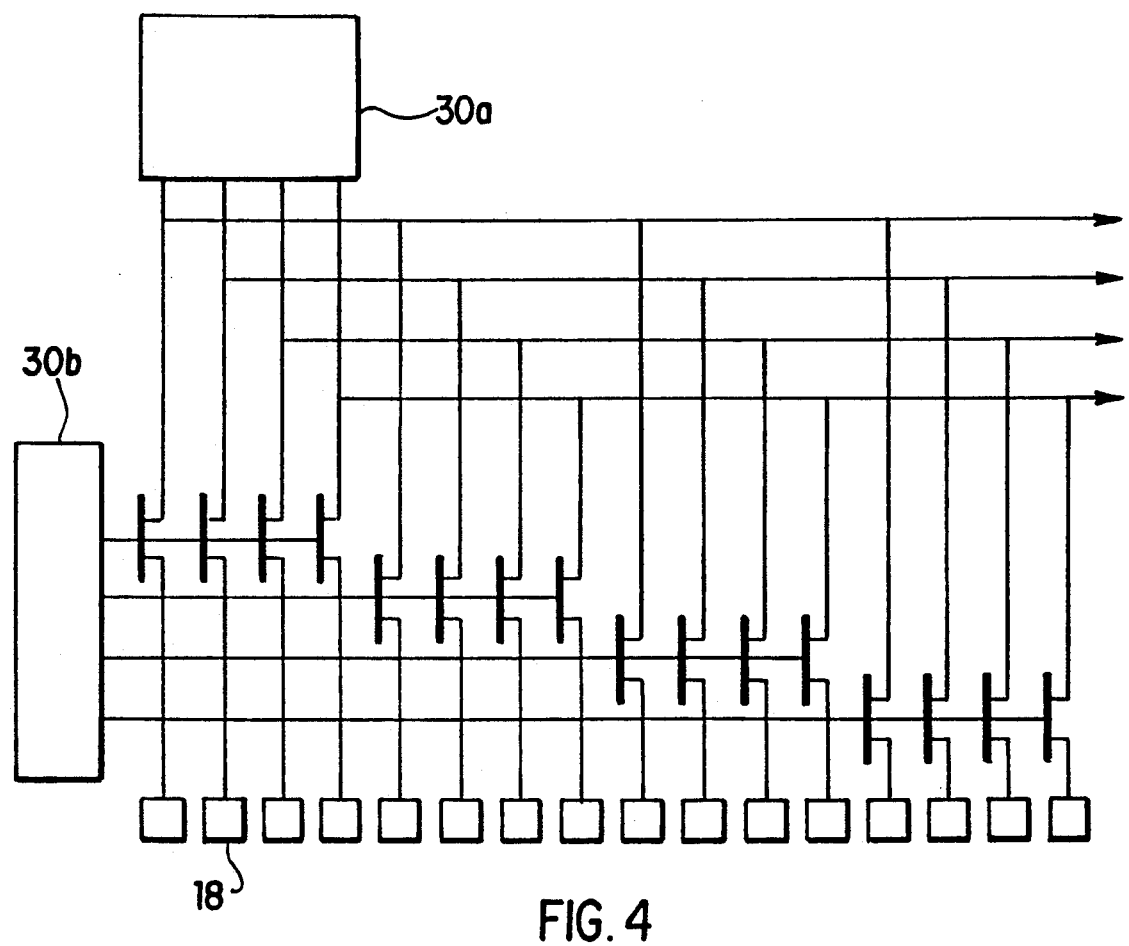
FIG. 4 is a plan view showing circuitry for addressing an extended array of pixel electrodes.

Means 30 for applying a voltage to each pixel electrode 18 is shown in FIGS. 3 and 4. Means 30 can include, for example, a drive chip 30a and a select chip 30b which function together in a well-known manner to supply driving signals to a plurality of TFT's 26, each of which is attached to a corresponding pixel electrode 18. Select chip 30b includes a select bus-line 31b which includes a plurality of signal lines each of which communicates with an equal number (or set) of TFTs 26 (see FIG. 4). Drive chip 30a includes a drive bus-line 31a which includes a plurality of signal lines, each signal line being attached to a single TFT 26 in each set of TFTs. Such circuitry for controlling a plurality of pixel electrodes is well known and illustrated in, for example, U.S. Pat. Nos. 4,602,850 to DeBenedetti, the disclosure of which is herein incorporated by reference as well as 4,783,146 to Stephany et al.

Figure 5:
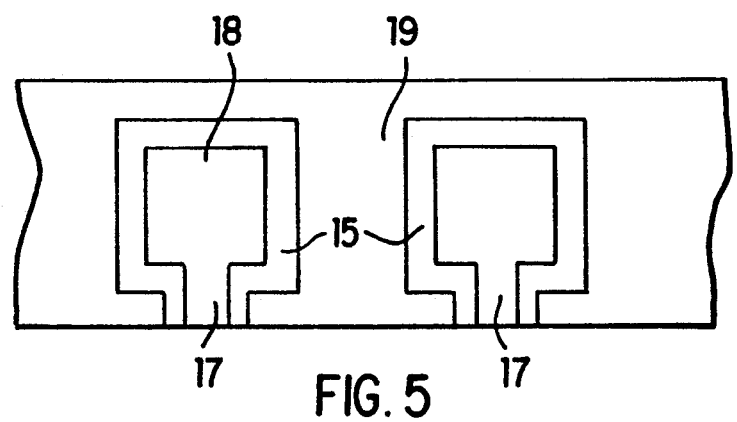
FIG. 5 is a plan view of a first plate containing two pixel electrodes surrounded by a background electrode in an image bar constructed according to the present invention.

FIG. 5 is an enlarged plan view of two pixel electrodes 18 and the background electrode 19 which substantially surrounds each of these pixel electrodes 18. Conventionally, when forming a linear array of pixel electrodes 18, a substrate, such as a transparent glass plate, was coated with a band of transparent electrode material, such as, for example, ITO, and all of the ITO material was removed except where pixel electrodes were desired. With the present invention, only a small portion of the electrode material is removed so that most of the electrode material located between pixel electrodes 18 remains on the glass substrate. This construction results in one or more pixel electrodes 18 have a background electrode 19 located closely adjacent and laterally spaced from outer peripheral surfaces of the pixel electrode(s). A relatively narrow addressing portion 17 can be provided on each pixel electrode 18 for attachment of the pixel electrode 18 to control circuitry. The pixel electrode 18 (including its addressing portion 17) is surrounded by a narrow gap 15 which prevents each pixel electrode 18 from being short circuited. As stated earlier, this gap can be formed by removing electrode material from the glass substrate using standard processing or even laser etching. The widths of space 15 can be, for example, 1 to 50 micrometers, preferably 2 to 10 micrometers.

Figure 6A:
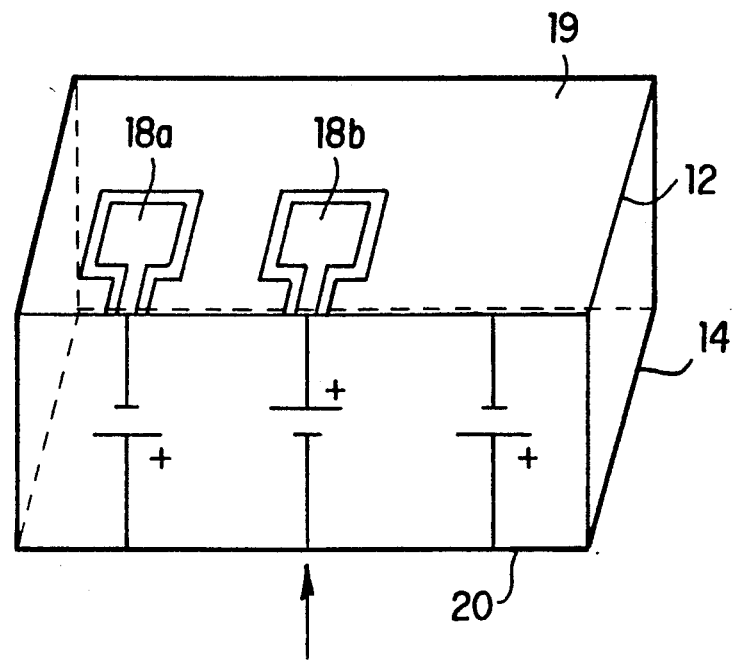
FIGS. 6A–C are isometric views of an image bar constructed according to the present invention wherein the background electrode is biased so as to create an electronic mask between pixels.
Figure 6B:
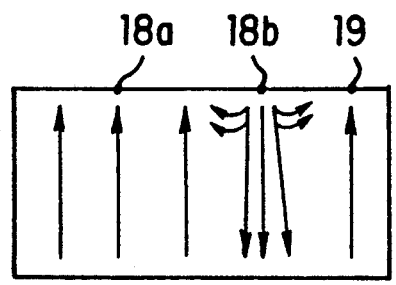
Figure 6C:
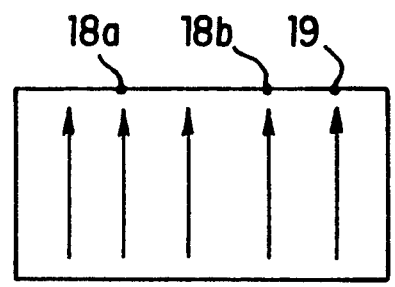

FIGS. 6A-C illustrate a manner in which background electrode 19 is biased to form an electronic mask between individual pixel electrodes 18. In the example shown in FIG. 6A, electrode 18b is provided with a voltage so that the voltage potential between electrode 18 and backplane electrode 20 is sufficient to cause the ferroelectric material located between pixel electrode 18b and backplane electrode 20 to permit the transmission of light therethrough. Pixel electrode 18a, on the other hand, is provided with a voltage so that the voltage potential between pixel electrode 18a and backplane electrode 20 is sufficient to cause the ferroelectric material located between pixel electrode 18a and backplane electrode 20 to block the transmission of light therethrough. Additionally, background electrode 19 is supplied with a voltage so that the voltage potential which exists between background electrode 19 and backplane electrode 20 is sufficient to cause the ferroelectric material located between background electrode 19 and backplane electrode 20 (and located between and surrounding pixel electrodes 18a and 18b) to block the passage of light therethrough. Thus, each pixel electrode 18 is a precisely delineated light shutter and the image bar or display created by arranging a plurality of these pixel electrodes 18 in a linear array or matrix is capable of producing images having a high degree of contrast between light and dark areas.

FIG. 6B shows the electric-field pattern corresponding to the case of light transmission in FIG. 6A. The field at pixel 18b is opposite to that in 18a and in the background area 19. FIG. 6C shows the field pattern when the ferroelectric liquid crystal in pixel 18b is switched to the dark state. The field is now everywhere uniform and pointing in the same direction. This condition is obtained by reversing the polarity of the voltage at pixel 18b from the polarity shown in FIG. 6A and FIG. 6B.

Figure 7:
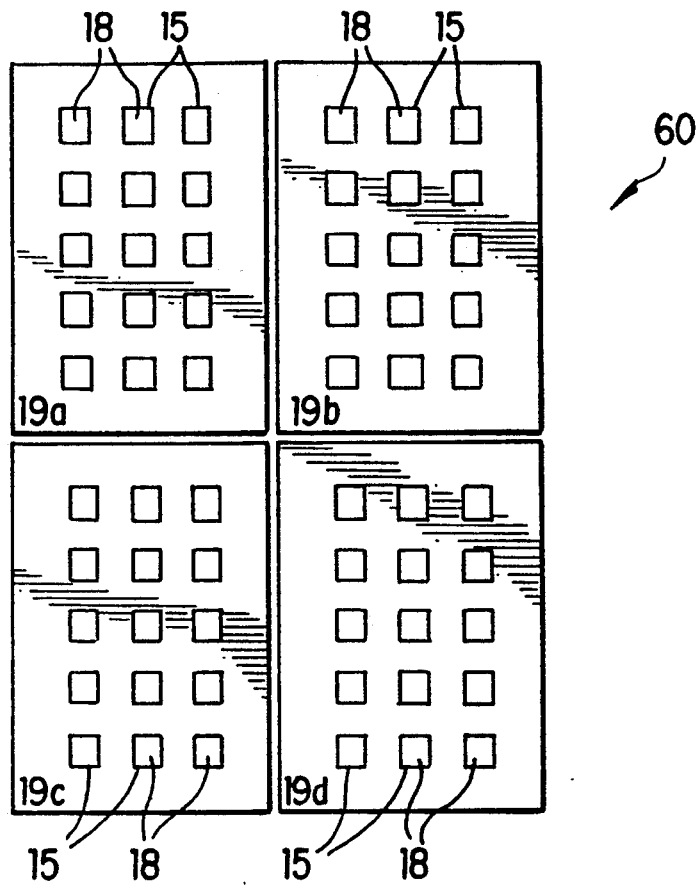
FIG. 7 is a plan view of a display having a matrix of pixel electrodes surrounded by one or more background electrodes.

FIG. 7 is a plan view of a display 60 which includes a plurality of pixel electrodes 18 arranged in a matrix. FIG. 7 also illustrates a background electrode arrangement wherein the background electrode is divided in a plurality of background electrodes 19a-19d. As stated above, the provision of a plurality of background electrodes 19a-19d, permits the regions located between pixel electrodes 18 to be uniformly controlled for selected groups of pixel electrodes 18 in the matrix. It is understood that each pixel electrode 18 in the display 60 of FIG. 7 is surrounded by a space 15 which prevents each pixel electrode 18 from being short circuited with its surrounding background electrode 19a-19d. Additionally, the plurality of background electrodes can be used with a further aspect of the present invention wherein electric fields which are transverse to the direction in which the ferroelectric material molecules are polarized are applied to the ferroelectric material to reduce the delay time between the different orientation states of the ferroelectric material.

It is believed that the delay times in ferroelectric systems are caused in part by poor coupling of an applied field to the ferroelectric material molecules when they are in a saturated state. For example, when it is desired to change the orientation of the ferroelectric material molecules from the orientation illustrated in FIG. 2a to the orientation illustrated in FIG. 2b, the polarity of the electric field applied to the ferroelectric material is reversed. However, since this newly applied electric field is parallel to the previously applied field (although in the opposite direction) and also parallel to the orientation of the ferroelectric polarization vector, the coupling of the newly applied electric field is initially poor. In order for the field to develop the initial switching torque, natural thermal fluctuations were previously relied upon to couple the newly applied field to the ferroelectric material molecules. Thermal fluctuations are erratic motions on a small scale which arise from the thermal energy of the molecules. The molecules are not rigidly constrained with their polarization parallel to the field but move slightly around that orientation with zero net deviation. However, when relying solely upon thermal fluctuations, the torque developed is small until a significant movement of the molecules way from their orientation with respect to the field occurs. The present invention involves the use of electric fields which are transverse to the polarization vector of the ferroelectric material molecules in their equilibrium orientation to jolt the molecules out of their equilibrium (or saturation) condition so that the main longitudinal field (i.e., the longitudinal switching electric field which is to orient the molecules into their subsequent equilibrium condition) can take effect without recourse to thermal fluctuations to initiate the transition.

A convenient way of introducing a transverse field involves the use of the electrodes on the first and second plates 12, 14. The electrodes used to apply the transverse fields can be on one, or both, of the substrates, and the transverse field can be applied in one plane (i.e., in one of plates 12, 14) or from plate-to-plate but at an angle to the normal of the plates so as to generate a field which is transverse to the polarization direction of the molecules. For improved response times, the transverse field need only be applied for a period at the start of a transition from one to the other equilibrium state and does not need to be of the same magnitude as the longitudinal switching field, although it is to be expected that the higher the transverse field, the shorter the delay.

Any number of means can be provided for creating a field through the ferroelectric material 16 which is at an angle between 0° and 180° to a direction in which ferroelectric material molecules located between each respective pixel electrode 18 and the backplane electrode 20 is polarized. The means for creating this field (transverse field) can be one or all of the circuitry 30, 32, 34 which controls the voltage applied to the pixel electrodes 18, background electrode 19 and backplane electrode 20. Additionally, and as stated above, the respective background and backplane electrodes can be divided into a plurality of electrodes and the transverse field can be applied between the plurality of background and backplane electrodes.

For example, means can be provided for creating a voltage potential between the pixel electrode 18 and the background electrode 19 to create a transverse field which is parallel to a plane containing first plate 12. This transverse field can be applied, for example, by controlling the voltages applied to the pixel electrode 18 and background electrode 19 using control circuitry 30, 32, respectively. When the polarity of the voltage applied by circuitry 30 to pixel electrode 18 is switched to cause the orientation of the molecules between pixel electrode 18 and backplane electrode 20 to change from the orientation illustrated in FIG. 2a to the orientation illustrated in FIG. 2b, a voltage potential can be applied by circuitry 32 to background electrode 19 so that a voltage potential also exists between pixel electrode 18 and background electrode 19 creating a transverse field which is parallel to first plate 12 and substantially perpendicular to the previous equilibrium orientation of the ferroelectric polarization to assist in moving these molecules from the orientation illustrated in FIG. 2a to the orientation illustrated in FIG. 2b. The voltage applied to background electrode 19 need only last for a short time such as, for example, 1 μsec to 50 μsec.

Alternatively, the background electrode 19 can be divided into a plurality of background electrodes and the circuitry 32 can selectively apply different voltages to adjacent background electrodes 19 so as to create the transverse field between each of the adjacent background electrodes 19, which transverse field would also extend in a direction parallel to first plate 12. Similarly, the backplane electrode 20 can be divided into a plurality of backplane electrodes. Circuitry 34 can then be used to selectively apply a different voltage to adjacent backplane electrodes 20 to create a transverse field which extends in a direction parallel to the second plate 14.

Means can also be provided for creating a first component field by applying a voltage potential between adjacent electrodes located in one of plates 12 and 14 and for creating a second component field by applying a voltage potential between electrodes located in first and second plates 12 and 14. Thus, the first component field would be parallel to the first and second plates 12, 14, while the second component field would be perpendicular to the first and second plates 12, 14, so as to create a resulting field which is at an angle between 0° and 180° to planes containing the first and second plates 12, 14, respectively, and thus would extend at a non-parallel angle to the axis of the ferroelectric molecules in their equilibrium (or saturated) condition. For example, the first component field which is parallel to the first and second plates 12, 14 can be created in a manner described above. The second component field can be created by, for example, applying a voltage potential between the background electrodes 19 and backplane electrodes 20 or between the pixel electrodes 18 and backplane electrodes 20.

Furthermore, the transverse field could be created by dividing the background and backplane electrodes into a plurality of background and backplane electrodes. The plurality of background and backplane electrodes could have voltage potentials applied between non-opposing background and backplane electrodes so that the resulting field would extend between these non-opposing background and backplane electrodes and thus would be at an angle to the longitudinal axis of the ferroelectric material molecules when in an equilibrium state.

Figure 8:
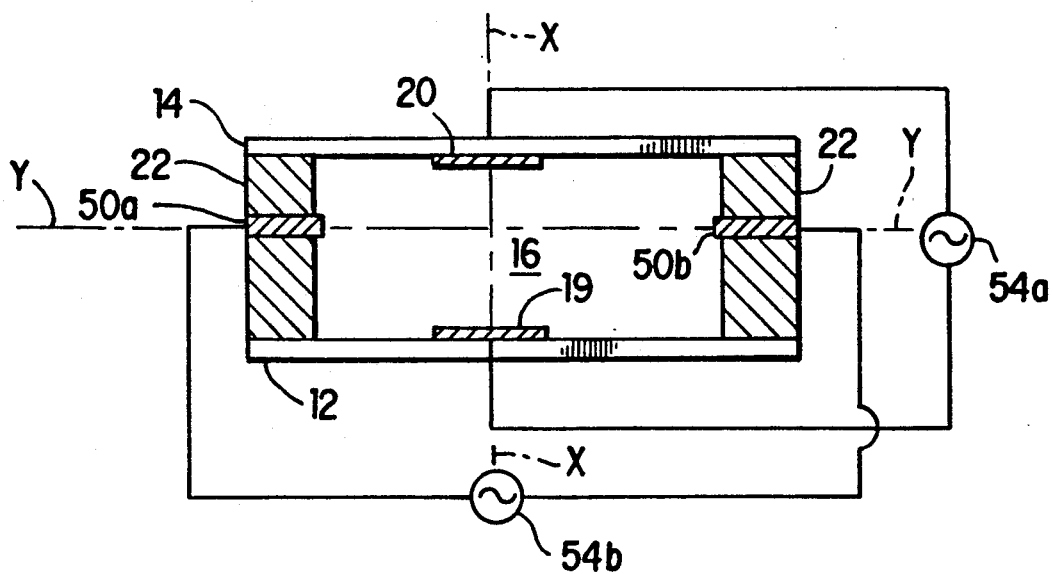
FIG. 8 is a cross-sectional view of a liquid crystal device which diagrammatically illustrates circuitry for applying a rotating electric field to a light shutter.

Another way of creating transverse fields within a ferroelectric liquid crystal device is illustrated in FIG. 8. The structure shown in FIG. 8 permits the creation of a rotating electric field within the ferroelectric material 16 to assist in "jolting" the ferroelectric material molecules out of their equilibrium condition when it is desired to switch the orientation of these molecules between their light blocking and light transmitting states. The virtue of having the field rotate is that it can be kept in phase to drive the molecules through the switching period thereby achieving the ultimate response time for a given material. In switching from one state to another, the field rotates from an orientation perpendicular to the substrates through a parallel one, to a perpendicular one but in the opposite polarity, at a rate which maintains optimum coupling to the polarization vector. If desired, the rotating field can be maintained in a circular fashion as long as the external voltage sources are applied. Since the ferroelectric polarization maintains an in-phase relationship with respect to the field, the molecules will also rotate as long as the field exists. The liquid crystal is then driven by the field, overcoming its own restoring forces, to produce bright and dark transmission patterns. A transmission, varying directly with the frequency of the rotating field, is thus imparted to the device, which may make it useful as a display.

Generally speaking, a rotating electric field can be created by creating a first component field through the ferroelectric material, creating a second component field through the ferroelectric material, which second component field is orthogonal to the first component field, and varying the first and second component fields at similar frequencies whereby a rotating field is created through the ferroelectric material. The first and second component fields are created by applying voltage potentials between first and second pairs of electrodes, respectively, which first and second pairs of electrodes are arranged in first and second axes which are perpendicular to each other. This concept is similar to the manner in which electric fields are applied to stator windings in a motor to cause a rotor to rotate.

As shown in FIG. 8, a pair of auxiliary electrodes 50a and 50b are located between the first and second plates 12, 14 along axis Y. These auxiliary electrodes 50a, 50b can be located in, for example, the spacer 22 which separates the first and second plates 12, 14. Circuitry 54a is then provided for applying a voltage potential between background electrode 19 and backplane electrode 20 to create the first component field through the ferroelectric material. Alternatively, the first component field can be created by applying a voltage potential with circuitry 54a across pixel electrode 18 and backplane electrode 20. The electrodes to which circuitry 54a is attached (e.g., background electrode 19 and backplane electrode 20) are arranged in axis X which is orthogonal to axis Y. A second source 54b applies a voltage potential between auxiliary electrodes 50a and 50b to create the second component field through the ferroelectric material which is orthogonal to the first component field. The amplitudes and frequencies of the signals applied by sources 54a and 54b are then varied to create a rotating field through the ferroelectric material. For example, a cosine wave can be applied by first source 54a while a sine wave is applied by second source 54b, both the sine and cosine waves having the same frequencies.

The rotating electric field can be applied only when the orientation of the ferroelectric material is being switched, or can be applied continuously. Although continuous application of the rotating electric field may cause the display to flicker, if the frequency of the applied signals is high enough, this flicker may not be perceptible to the human eye. The use of the rotating electric field to cause the display to flicker may, under certain circumstances, be desirable. For example, flickering displays may be desired when the image which is displayed is to be oscillating or moving.

While the present invention is described with reference to a particular embodiment, this particular embodiment is intended to be illustrative, not limiting. Various modifications may be made without departing from the spirit and scope of the invention as defined in the appended claims.

What is claimed is:

1. A liquid crystal device comprising:
   a first transparent plate;
   a second plate arranged substantially parallel to said first plate;
   a ferroelectric material sealed between said first and second plate;
   at least one pixel electrode located on said first plate;
   a background electrode located on said first plate closely adjacent to and spaced from said at least one pixel electrode, said background electrode being non-overlapping with and laterally spaced from an outer periphery of said at least one pixel electrode; and
   a backplane electrode located on said second plate opposing said at least one pixel electrode and said background electrode.

2. The liquid crystal device of claim 1, further comprising:
   means for applying a voltage potential between said at least one pixel electrode and said backplane electrode so that ferroelectric material located between said at least one pixel electrode and said backplane electrode can be selectively biased to one of the light transmission levels of preventing transmission of light therethrough and permitting transmission of light therethrough; and
   means for applying a voltage potential between said background electrode and said backplane electrode so that ferroelectric material located between said background electrode and said backplane electrode can be uniformly biased to form an electronic mask closely adjacent said at least one pixel electrode.

3. The liquid crystal device of claim 1, wherein said at least one pixel electrode includes a plurality of equally spaced pixel electrodes located in a linear array on said first plate, said background electrode extending at least between each pixel electrode on said first plate.

4. The liquid crystal device of claim 3, wherein said background electrode and said plurality of pixel electrodes are located on a same side of said first plate.

5. The liquid crystal device of claim 3, wherein each pixel electrode includes an addressing portion extending outwardly from an outer periphery thereof for attachment to control circuitry, and said background electrode surrounds substantially all of each pixel electrode except where each respective addressing portion extends therefrom.

6. The liquid crystal device of claim 5, wherein said background electrode and said plurality of pixel electrodes are located on a same side of said first plate.

7. The liquid crystal device of claim 1, wherein said background electrode is located at least on opposite sides of an outer periphery of said at least one pixel electrode.

8. The liquid crystal device of claim 7, wherein said at least one pixel electrode includes an addressing portion extending outwardly from said outer periphery thereof for attachment to control circuitry, and said background electrode surrounds substantially all of said at least one pixel electrode except where said addressing portion extends therefrom.

9. The liquid crystal device of claim 1, further comprising:
   means for applying a voltage potential between said at least one pixel electrode and said backplane electrode, and between said background electrode and said backplane electrode, so that ferroelectric material located between said first and second plates can be selectively biased along a polarization vector into one of conditions of permitting the transmission of light therethrough and blocking the transmission of light therethrough, wherein the voltage potential applied between said at least one pixel electrode and said backplane electrode is always different from the voltage potential applied between said background electrode and said backplane electrode, except when no light is permitted to be passed through said first and second plates.

10. The liquid crystal device of claim 9, further comprising:
means for creating a field through said ferroelectric material which is at an angle between 0° and 180° to said polarization vector of the ferroelectric material at least during a time period when the voltage potential applied by said means for applying a voltage between said at least one pixel electrode and said backplane electrode is changed.

11. The liquid crystal device of claim 10, wherein said means for creating a field includes means for creating a voltage potential between said at least one pixel electrode and said background electrode whereby a direction of the field created by said means for creating a field is substantially parallel to a plane of said first plate.

12. The liquid crystal device of claim 10, wherein said means for creating a field includes means for creating a first component field by applying a voltage potential between said at least one pixel electrode and said background electrode, and means for creating a second component field by applying a voltage potential between said at least one pixel electrode and said backplane electrode, whereby a direction of the field which results from the combined effects of said first and second component fields is at an angle of between 0° and 180° to a plane of said first plate.

13. The liquid crystal device of claim 10, wherein said means for creating a field includes:
means for creating a first component field through said ferroelectric material; and
means for creating a second component field through said ferroelectric material, said second component field being orthogonal to said first component field;
wherein said first and second component fields vary at similar frequencies to create a rotating field through said ferroelectric material.

14. The liquid crystal device of claim 13, further comprising at least two auxiliary electrodes located within said ferroelectric material between said first and second plates and spaced from each other, and wherein said means for creating a first component field creates said first component field by applying a voltage potential between said backplane electrode and at least one of said at least one pixel and background electrodes, and said means for creating a second component field creates said second component field by applying a voltage potential between said at least two auxiliary electrodes.

15. The liquid crystal device of claim 10, wherein said background electrode is divided into a plurality of background electrodes which cumulatively surround said at least one pixel electrode, and said means for creating a field creates said field by applying a voltage potential between said plurality of background electrodes.

16. The liquid crystal device of claim 10, wherein said background electrode is divided into a plurality of background electrodes which cumulatively surround said at least one pixel electrode, and said backplane electrode is divided into a plurality of backplane electrodes, each of said plurality of backplane electrodes being located on said second plate so as to be arranged in non-opposing relationship to a corresponding one of said plurality of background electrodes on said first plate, wherein said means for creating a field creates said field by applying a voltage potential between non-opposing background and backplane electrodes.

17. The liquid crystal device of claim 1, wherein said background electrode is divided into a plurality of background electrodes which cumulatively surround said at least one pixel electrode.

18. The liquid crystal device of claim 1, wherein said second plate is transparent.

19. A ferroelectric liquid crystal display comprising:
a first transparent plate;
a second plate arranged substantially parallel to said first plate;
a ferroelectric material sealed between said first and second plates;
a plurality of pixel electrodes located on said first plate and arranged in a matrix thereon;
a background electrode located on said first plate closely adjacent to and spaced from each of said plurality of pixel electrodes so as to substantially surround each pixel electrode individually as well as surround said matrix of pixel electrodes;
a backplane electrode located on said second plate opposing said plurality of pixel electrodes and said background electrode;
means for applying a voltage potential between said plurality of pixel electrodes and said backplane electrode so that ferroelectric material located between said plurality of pixel electrodes and said backplane electrode can be selectively biased to one of the light transmission levels of preventing transmission of light therethrough and permitting transmission of light therethrough; and
means for applying a voltage potential between said background electrode and said backplane electrode so that ferroelectric material located between said background electrode and said backplane electrode can be uniformly biased to form an electronic mask closely adjacent to each of said plurality of pixel electrodes.

20. The display of claim 19, wherein said plurality of pixel electrodes and said background electrode are located on a same side of said first plate.

21. The display of claim 19, wherein said background electrode is laterally spaced from an outer periphery of each of said plurality of pixel electrodes.

22. The display of claim 19, wherein said background electrode is divided into a plurality of background electrodes which cumulatively surround said matrix of pixel electrodes.

23. The display of claim 19, wherein said second plate is transparent.

24. A ferroelectric liquid crystal display comprising:
a first transparent plate;
a second plate arranged substantially parallel to said first plate;
a ferroelectric material sealed between said first and second plates;
a plurality of pixel electrodes located on said first plate and arranged in a matrix thereon;
a background electrode located on said first plate closely adjacent to and spaced from each of said plurality of pixel electrodes so as to substantially surround each pixel electrode individually as well as surround said matrix of pixel electrodes;
a backplane electrode located on said second plate opposing said plurality of pixel electrodes and said background electrode; and
means for applying voltage potentials between each of said plurality of pixel electrodes and said backplane electrode, and between said background electrode and said backplane electrode, so that ferroelectric material located between said first and second plates can be selectively biased along a polarization vector into one of the conditions of permitting the transmission of light therethrough and blocking the passage of light therethrough, wherein said means for applying voltage potentials selectively applies a voltage potential between each of said pixel electrodes and said backplane electrode based on image data to cause said pixel electrodes to cumulatively form images by controlling the light transmission levels of ferroelectric material located adjacent each pixel electrode, while applying a voltage potential between said background electrode and said backplane electrode so as to uniformly control the light transmission level of ferroelectric material located adjacent said background electrode to form an electronic mask between said pixel electrodes.

25. The display of claim 24, wherein said background electrode is divided into a plurality of background electrodes, and said means for applying voltage potentials applies a voltage potential to each of said background electrodes.

26. The display of claim 24, further comprising:
means for creating a field through said ferroelectric material which is at an angle between 0° and 180° to said polarization vector of the ferroelectric material at least during a time period when the voltage potential applied by said means for applying a voltage between said pixel electrodes and said backplane electrode is changed.

27. The display according to claim 26, wherein said means for creating a field includes means for creating a voltage potential between said pixel electrodes and said background electrode whereby a direction of the field created by said means for creating a field is parallel to a plane of said first plate.

28. The display according to claim 26, wherein said means for creating a field includes means for creating a first component field by applying a voltage potential between said pixel electrodes and said background electrode, and means for creating a second component field by applying a voltage potential between said pixel electrodes and said backplane electrode, whereby a direction of the field which results from the combined effects of said first and second component fields is at an angle of between 0° and 180° to a plane of said first plate.

29. The display of claim 26, wherein said means for creating a field includes:
means for creating a first component field through said ferroelectric material; and
means for creating a second component field through said ferroelectric material, said second component field being orthogonal to said first component field;
wherein said first and second component fields vary at similar frequencies to create a rotating field through said ferroelectric material.

30. The display of claim 29, further comprising at least two auxiliary electrodes located within said ferroelectric material between said first and second plates and spaced from each other, and wherein said means for creating a first component field creates said first component field by applying a voltage potential between said backplane electrode and one of said pixel and background electrodes, and said means for creating a second component field creates said second component field by applying a voltage potential between said at least two auxiliary electrodes.

31. The display of claim 26, wherein said background electrode is divided into a plurality of background electrodes which cumulatively surround said pixel electrodes, and said means for creating a field creates said field by applying a voltage potential between said plurality of background electrodes.

32. The display of claim 26, wherein said background electrode is divided into a plurality of background electrodes which cumulatively surround said pixel electrodes, and said backplane electrode is divided into a plurality of backplane electrodes, each of said plurality of backplane electrodes being located on said second plate so as to be arranged in non-opposing relationship to a corresponding one of said plurality of background electrodes on said first plate, wherein said means for creating a field creates said field by applying a voltage potential between non-opposing background and backplane electrodes.

33. A liquid crystal device comprising:
a first transparent plate;
a second plate arranged substantially parallel to said first plate;
a ferroelectric material sealed between said first and second plates;
at least one pixel electrode located on said first plate;
a backplane electrode located on said second plate opposing said at least one pixel electrode;
means for applying a voltage potential between said at least one pixel electrode and said backplane electrode so that ferroelectric material located between said at least one pixel electrode and said backplane electrode can be selectively biased along a polarization vector to one of the light transmission levels of preventing transmission of light therethrough and permitting transmission of light therethrough; and
means for creating an electric field through said ferroelectric material which is at an angle between 0° and 180° to said polarization vector of the ferroelectric material at least during a time period when the voltage potential applied by said means for applying a voltage potential between said at least one pixel electrode and said backplane electrode is changed by said means for applying a voltage potential.

34. The liquid crystal device of claim 33, wherein said means for creating a field includes:
means for creating a first component field through said ferroelectric material; and
means for creating a second component field through said ferroelectric material, said second component field being orthogonal to said first component field;
wherein said first and second component fields vary at similar frequencies to create a rotating field through said ferroelectric material.

35. The liquid crystal device of claim 34, further comprising:
a background electrode located on said first plate closely adjacent to and spaced from said at least one pixel electrode.

36. The liquid crystal device of claim 35, further comprising at least two auxiliary electrodes located within said ferroelectric material between said first and second plates and spaced from each other, and wherein said means for creating a first component field creates said first component field by applying a voltage potential between at least one of said at least one pixel and background electrodes and said backplane electrode, and said means for creating a second component field creates said second component field by applying a voltage potential between said at least two auxiliary electrodes.

37. The liquid crystal device of claim 33, further comprising at least two auxiliary electrodes located within said ferroelectric material between said first and second plates and spaced from each other, and wherein said means for creating a first component field creates said first component field by applying a voltage potential between said backplane electrode and at least one of said at least one pixel and background electrodes, and said means for creating a second component field creates said second component field by applying a voltage potential between said at least two auxiliary electrodes.

38. The liquid crystal device of claim 37, further comprising:
means for applying a voltage potential between said background electrode and said backplane electrode so that ferroelectric material located between said background electrode and said backplane electrode can be uniformly biased to form an electronic mask closely adjacent to said at least one pixel electrode.

39. The liquid crystal device of claim 37, wherein said means for creating a field includes means for creating a voltage potential between said at least one pixel electrode and said background electrode whereby a direction of the field created by said means for creating a field is substantially parallel to a plane of said first plate.

40. The liquid crystal device of claim 37, wherein said means for creating a field includes means for creating a first component field by applying a voltage potential between said at least one pixel electrode and said background electrode, and means for creating a second component field by applying a voltage potential between said at least one pixel electrode and said backplane electrode, whereby a direction of the field which results from the combined effects of said first and second component fields is at an angle of between 0° and 180° to a plane of said first plate.

41. The liquid crystal device of claim 37, wherein said background electrode is divided into a plurality of background electrodes which cumulatively surround said at least one pixel electrode, and said means for creating a field creates said field by applying a voltage potential between said plurality of background electrodes.

42. The liquid crystal device of claim 37, wherein said background electrode is divided into a plurality of background electrodes which cumulatively surround said at least one pixel electrode, and said backplane electrode is divided into a plurality of backplane electrodes, each of said plurality of backplane electrodes being located on said second plate so as to be arranged in non-opposing relationship to a corresponding one of said plurality of background electrodes on said first plate, wherein said means for creating a field creates said field by applying a voltage potential between non-opposing background and backplane electrodes.

* * * * *